No. 787,028. PATENTED APR. 11, 1905.
G. H. DUKE.
DAM FOR IRRIGATING DITCHES.
APPLICATION FILED NOV. 21, 1904.
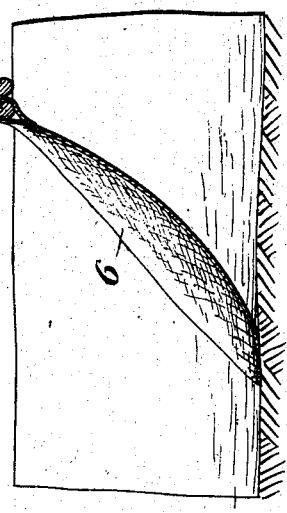
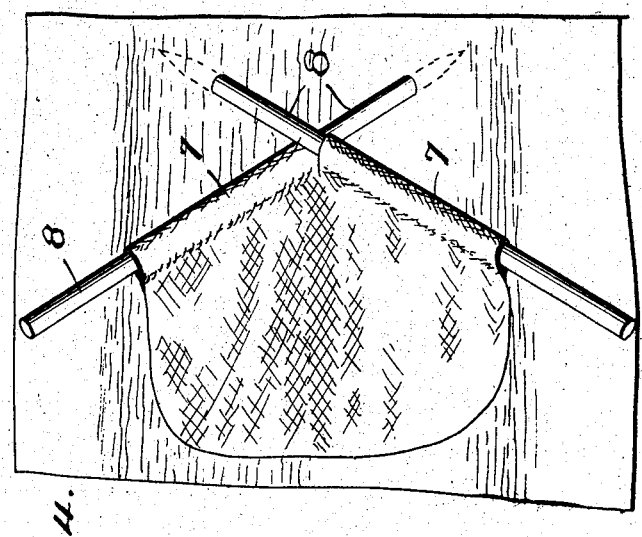
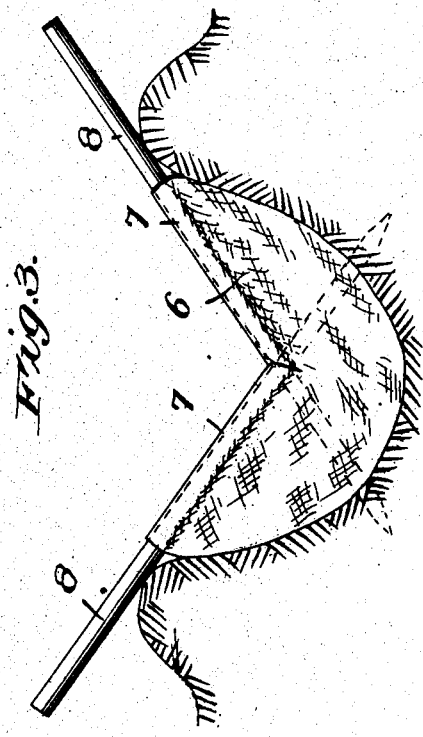
WITNESSES:
INVENTOR
George H. Duke,
BY
Milo B. Stevens & Co.
Attorneys.

No. 787,028. Patented April 11, 1905.

UNITED STATES PATENT OFFICE.

GEORGE H. DUKE, OF HOTCHKISS, COLORADO.

DAM FOR IRRIGATING-DITCHES.

SPECIFICATION forming part of Letters Patent No. 787,028, dated April 11, 1905.

Application filed November 21, 1904. Serial No. 233,747.

*To all whom it may concern:*

Be it known that I, GEORGE H. DUKE, a citizen of the United States, residing at Hotchkiss, in the county of Delta and State of Colorado, have invented new and useful Improvements in Dams for Irrigating-Ditches, of which the following is a specification.

This invention is an apron-dam particularly adapted for use in irrigation-ditches. The object of the device is to provide a dam which may be adjusted to take more or less water from the ditch, as desired. This object is effected by the use of an apron supported by two bars or rods, each of which supports one side or half of the apron. These bars may be crossed to form low dams of various heights, in which position the outer ends of the bars rest on either bank and the inner ends are driven into the bottom or sides of the ditch, or they may be arranged to form a high dam by placing the bars parallel and resting the ends of the bars on both banks.

In the accompanying drawings, Figure 1 is an elevation or front view of the dam at full height. Fig. 2 is a section on the line 2 2 of Fig. 1. Fig. 3 is a front elevation of a low dam. Fig. 4 is a plan view thereof.

Referring specifically to the drawings, the apron is indicated at 6 and has at the upper edge tubular portions 7, in which the bars 8 are respectively slidable lengthwise. Each bar supports one side or half of the apron, and they can be brought into parallelism or crossed at the middle to any angle desired. When arranged parallel to form a high dam, the bars rest at their respective ends upon both banks of the ditch. When crossed to form a low dam, as indicated in Figs. 3 and 4, the end of each bar is driven in the opposite bank, and the height of the dam is determined by the angle at which the bars are crossed—the greater the angle the higher the dam. The dam can thus be adjusted to any desired height, the object being to dam the ditch sufficiently to take therefrom the required amount of water, the surplus water continuing down the ditch. Consequently as many dams can be used as desired. It is to be observed that when the bars are crossed the lowest point of the dam is at the middle, which is advantageous, since it draws the water to the middle, and thereby prevents it from cutting around the dam into the banks at the side.

The device will be found very cheap and useful in connection with agricultural irrigation.

What I claim as new, and desire to secure by Letters Patent, is—

1. A dam comprising an apron, and a pair of bars each of which is attached along part of the upper edge thereof, and arranged to be crossed, as and for the purpose stated.

2. A dam comprising an apron, and a pair of bars each of which is connected to one side portion of the upper edge of the apron, and which may be crossed, and moved lengthwise with respect to said edge.

In testimony whereof I have signed my name to this specification in the presence of two subscribing witnesses.

GEORGE H. DUKE.

Witnesses:
 FRED W. SIMONDS,
 THEO. KRUEMLING.